L. MYERS.
FREIGHT CAR.
No. 1,910.
REISSUED MAR. 21, 1865.
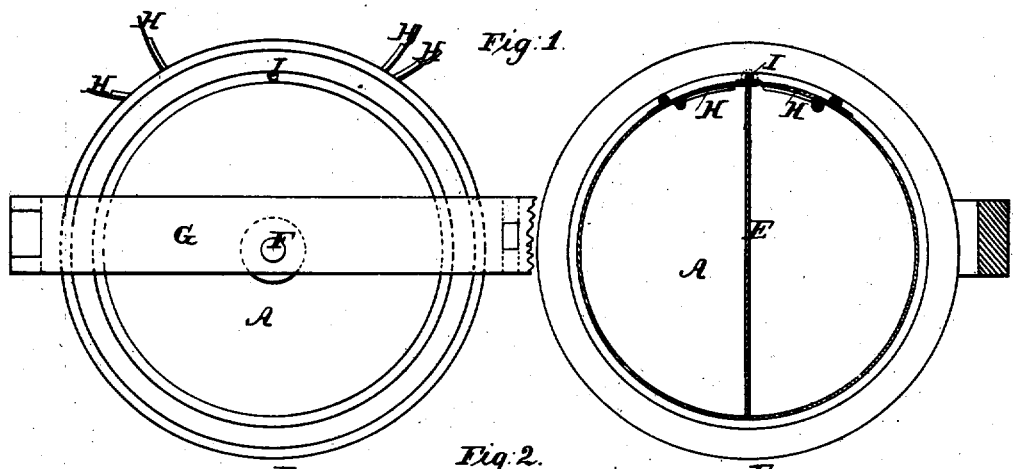
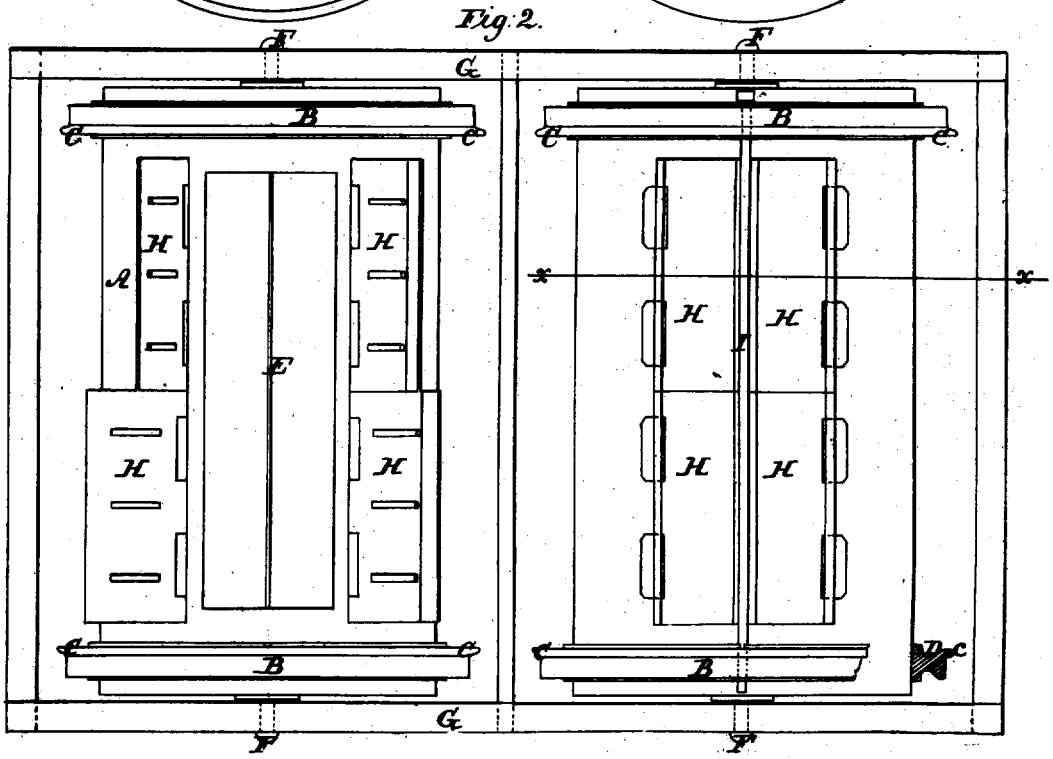

UNITED STATES PATENT OFFICE.

LAWRENCE MYERS, OF PHILADELPHIA, PENNSYLVANIA.

RAILROAD-CAR.

Specification forming part of Letters Patent No. 8,177, dated June 24, 1851; Reissued March 21, 1865, No. 1,910.

*To all whom it may concern:*

Be it known that I, LAWRENCE MYERS, of Philadelphia, Pennsylvania, did on the 24th day of June, 1851, obtain Letters Patent for Cars for Transportation, that I deem the said Letters Patent inoperative and invalid by reason of a defective specification, and that the following is a full, clear, and exact description of the said invention, reference being had to the accompanying drawing and to the letters of reference marked thereon.

My invention consists of one, two or more vessels of cylindrical form, combined with flanged wheels or tires adapted to the rails of a railroad, the vessels having journals adapted to boxes on a frame, and the loads contained in the vessels revolving therewith so that centrifugal force shall maintain the said loads in place.

My invention further consists in combining with the said vessels, a certain partition or partitions in the manner and for the purpose described hereafter.

In order to enable others to carry out my invention, I will now proceed to describe the manner in which the same may be constructed.

On reference to the accompanying drawing which forms a part of this specification. Figure 1 is a side view partly in section of a car or truck with two of the hollow cylinders, one being in section, and Fig. 2 represents a plan view.

A is a hollow vessel of cylindrical form, and of a suitable length and diameter and closed at the ends. It may be made like the shell of a steam boiler, and may be strengthened by hoops or otherwise. Secured to or forming part of this vessel are flanged wheels which in the present instance are constructed by surrounding the cylinder with two tires B B arranged at a distance apart suitable for the track to the rails of which the flanges and treads of the tires are adapted. The diameter of the tires is so much greater than that of the cylinder that the latter shall be above any small obstructions on the road.

The interior of the cylinder as shown in the drawing is divided into two compartments by a central partition E passing from end to end, but it may be separated into more compartments by additional partitions.

The cylinder is provided with journals which in the present instance are secured to the ends and which turn in suitable boxes placed on or under the frame G as desired. As these journals have to support nothing more than the frame itself, there will be but little friction on them, and consequently but little wear and tear of the journals and boxes, and but little demand for lubricating material.

The cylinders have openings for the introduction and withdrawal of the material to be transported and these openings must be provided with movable or detachable covers. In the present instance the openings extend nearly the entire length of the cylinders, and to the opposite edges of the openings are hinged doors, H, H, which when closed are firmly secured by a rod I passing through the tires B. A brake may be applied by forcing a piece of wedge shaped timber between the tires of the two cylinders by means of a lever as in cars of ordinary construction.

When such materials as coal, grain etc. have to be transported in the cylinders, the partition is indispensable as it prevents the contents from being put in rotary motion by their gravity, when the centrifugal force is not sufficient to keep it in place, the partition tending partially to preserve the center of gravity of the load by dividing the vacancy in the cylinder, one half being above, and the other half below the center of the same.

It has been ascertained by actual experiment that however full the cylinder may be at the moment of starting, the contents will be packed by the rotation of the cylinders thus leaving a space which by the use of partitions is distributed, the load thereby properly equalized, and the cylinder allowed to move off more easily than when the vacant space is above the center of the cylinder, and the preponderance of the load below.

The wearing away of coal by abrasion has also been found by actual experiment to be three-fourths less than what is usually allowed for wastage in that article when conveyed in ordinary cars.

Among the advantages which this mode of constructing cars possesses over those in common use are first the large diameter of the wheels will present less obstruction or resistance to the locomotive; second, the weight of the load being removed from the journals, and sustained by the wheels, the wear of the journals and boxes by the friction is lessened and the use of oil economized, third, the material conveyed in tight cylinders, revolving at the usual velocity attained upon railroads will by centrifugal force remain perfectly quiet, and the motion of the cars is consequently steady.

I claim as my invention and desire to secure by Letters Patent.

1. The combination substantially as described of a hollow vessel with flanged wheels or tires adapted to the rails of a railroad for the purpose specified.

2. One or more partitions combined with the said hollow vessel substantially as and for the purpose described.

In testimony whereof, I have signed my name to this specification before two subscribing witnesses.

LAWRENCE MYERS.

Witnesses:

HENRY HOWSON,
JOHN WHITE.

[FIRST PRINTED 1911.]